United States Patent Office 3,190,496
Patented June 22, 1965

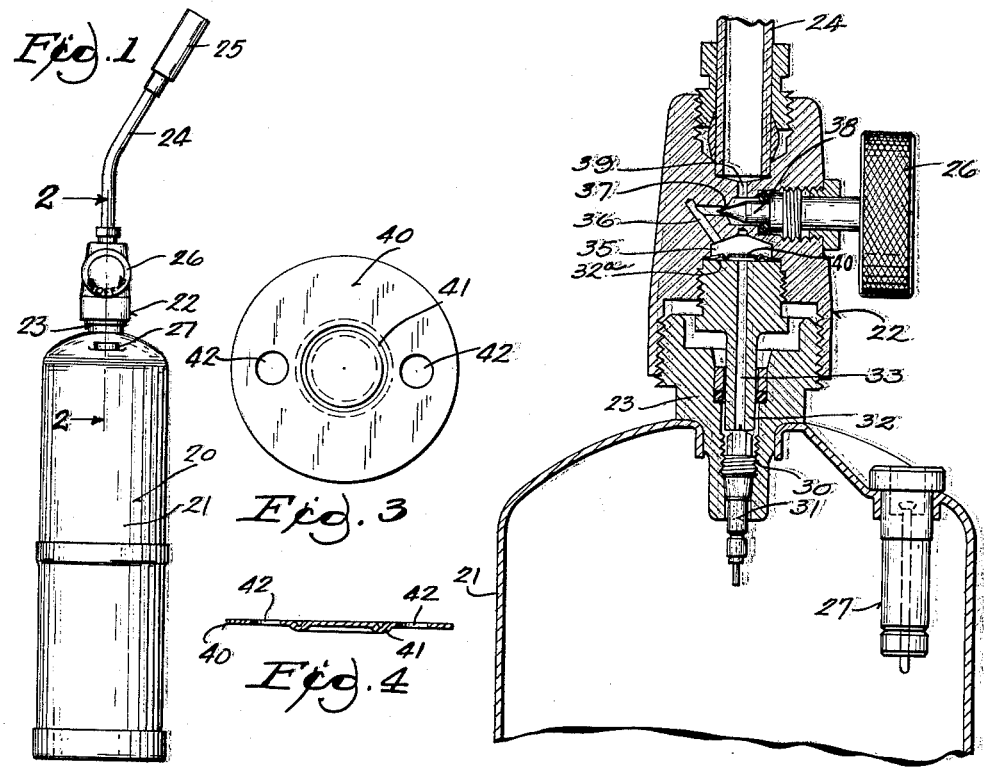
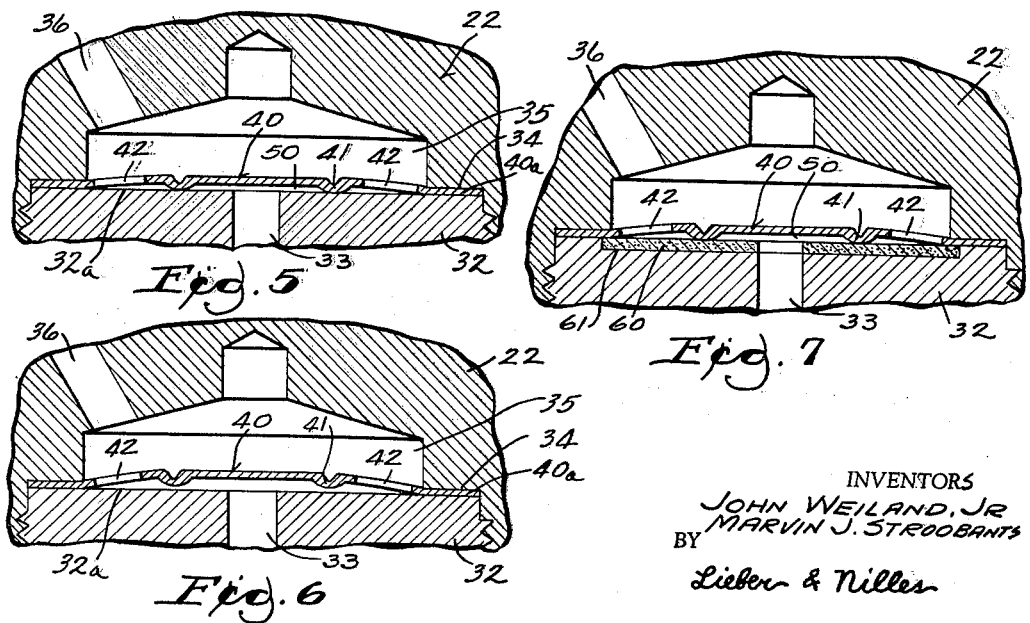

3,190,496
VALVE MEANS FOR PRESSURIZED GAS FUEL
John Weiland, Jr., Wauwatosa, and Marvin J. Stroobants, Chilton, Wis., assignors to Western Metal Specialty Division, Western Industries, Inc., Milwaukee, Wis., a corporation of Wisconsin
Filed Oct. 14, 1963, Ser. No. 315,966
4 Claims. (Cl. 222—3)

This invention relates to a portable pressurized gas fuel torch or the like, and more particularly to a fluid metering valve for said torch.

Portable pressurized gas fuel torches are well known in the art, and it is important that such torches maintain a proper flame while operating on a supply of pressurized liquified fuel regardless of the position of the torch. Difficulties with flame sputtering and flame failure have been encountered when the torch is tilted or inverted, for example.

Normally, an adjustable needle valve or the like is provided for establishing the proper torch or burner flame. Such adjustment of the flame is ordinarily made when the torch and attached pressure cylinder are in an upright position, though this upright position is by no means obligatory, and the flame adjustment should preferably remain as adjusted regardless of torch position. To accomplish the continuity of flame adjustment, a metering valve is provided between the pressurized cylinder and the adjustment for insuring that the proper flow of fuel is allowed to pass to the torch burner for maintaining the flame.

One such prior art valve embodies a metering valve housed within the body of a stem. However, this prior valve consists of a number of parts, thus adding to the complexity and cost of the valve. Furthermore, these prior valves have not proven entirely satisfactory in overall operation of the torch.

To improve the pressurized gas fuel torch, we have found that a simple diaphragm meter valve made from a thin disk and having metering apertures would satisfactorily provide the proper flow of gas fuel to the torch and maintain the desired flame regardless of torch position. By pre-stressing the thin diaphragm, the valving action of the apertured diphragm is such that it is urged to a closed position as accomplished by the simple provision of an annular detent in the diaphragm. The thin detented diaphragm is far less costly, less complicated and easier to assemble than the more elaborate valve above mentioned and it is furthermore more effective in controlling and metering the desired amounts of fuel to the torch with less likelihood of flame failure or other erratic action when the torch was tilted or inverted, or when the pressure cylinder pressure reduced as the cylinder emptied.

It is therefore an object of this invention to provide an improved metering valve for a pressurized gas fuel torch that maintains the desired torch flame regardless of torch position.

It is another object of this invention to provide a simplified metering valve for a pressurized gas fuel torch that is less costly and easier to maintain than prior art metering valves for gas fuel torches.

It is a further object of this invention to provide a simple pre-stressed diaphragm valve for effectively controlling gas fuel flow for a torch or the like.

It is another object of this invention to provide an annularly detented diaphragm having predetermined openings for simply controlling the flow of gas fuel of a torch or the like regardless of torch position.

It is a further object of this invention to provide a pre-stressed diaphragm valve wherein the pre-stressed pressure remains substantially constant in the closed position of the valve.

It is another object of this invention to provide a diaphragm-type metering valve for a pressurized gas fuel torch wherein inversion of the torch will not affect the metering action of the metering valve.

These and other more specific objects and advantages of the invention will be apparent from the following detailed description.

A clear conception of the several improved features constituting the present invention, and of a typical commercial embodiment thereof, may be had by referring to the drawings accompanying and forming a part of this specification, wherein like reference characters designate the same similar parts in the various views:

FIGURE 1 is an elevation of a pressurized gas fuel torch embodying the invention;

FIGURE 2 is an enlarged elevation in section taken along line 2—2 of FIGURE 1;

FIGURE 3 is a plan view of the detented diaphragm of the metering valve of FIGURE 2 prior to assembly in said gas fuel torch;

FIGURE 4 is an elevation of the detented diaphragm of FIGURE 3;

FIGURE 5 is an enlarged elevation in section of the metering valve of FIGURE 2;

FIGURE 6 is an enlarged elevation in section of the metering volve of FIGURE 2 in open position; and FIGURE 7 is an elevation of a modification of the invention of FIGURE 5.

Referring now to FIGURE 1 where a pressurized gas fuel torch is designated generally by reference numeral 20 and comprises a cylinder 21 for containing liquid fuel under pressure, a valve body unit 22 threadably engaging a cylinder plug 23, and a burner tube 24 equipped with a nozzle unit 25. For adjusting a flame emanating from the nozzle unit 25, an adjustment valve is provided having a knob 26. For relieving excessive pressures in the cylinder 21, a pressure relief valve 27 is provided.

Thus, by turning knob 26 counterclockwise, as viewed in the drawing, pressurized gas fuel flows from the cylinder 21, through valve body unit 22 and burner tube 24, to the nozzle unit 25 where the fuel may be ignited. The amount of flame issuing from the nozzle unit is adjusted by rotating knob 26 to allow more or less gas fuel to reach the nozzle unit 25. The torch 20 may then be used in any position, that is, upright, tilted, or inverted to perform the heating desired by the torch, while a flame emanating from the nozzle unit 25 remains as adjusted by knob 26, as hereinafter described in greater detail.

In FIGURE 2, the valve body unit 22 is shown threadably engaging cylinder plug 23 that has a central bore 30 longitudinally therethrough for receiving a tire valve unit 31 at a lower portion thereof. The valve unit 31 remains closed prior to insertion of stem 32 in the upper portion of bore 30, and the valve unit 31 is opened when the lower portion of stem 32 depresses valve unit 31 to allow gas fuel to flow from cylinder 21 when the adjustment knob 26 is in open position.

The stem 32 is provided with a bore 33 longitudinally therethrough. The valve body unit 22 is provided with annular threads for receiving stem 32. Valve body unit 22 is also provided with an annular shoulder 34 and a meter valve recess 35. The bore 33 allows gas flow between recess 35 and bore 30 of the cylinder plug 23 when meter valve diaphragm 40 is open (to be described in greater detail hereinafter). Gas flow passage 36 communicates between recess 35 and valve seat 37 of needle valve 38 which is adjusted to open and close by knob 26. A passage 39 communicates between valve seat 37 and burner tube 24. Thus, when needle valve 38 is opened, pressurized gas fuel in cylinder 21 flows from the cylinder, through valve 31 as unseated by stem 32, through bore 33 to recess 35 where the pressure unseats diaphragm valve 40 to allow the gas fuel to flow through passages 36 and 39 to burner tube 24 and nozzle unit 25.

For a detailed description of meter valve diaphragm 40, reference is made to FIGURES 3, 4, 5, and 6. The diaphragm 40 in the preferred embodiment, is a circular disk of thin metal to offer resiliency and having an annular detent 41, and the diaphragm is shown as being provided with a pair of diametrically opposed openings 42. Also, in the preferred embodiment, the combined area of openings 42 is greater than the cross-sectional area of bore 33 to insure expansion from a liquid to a gas of the pressurized gas fuel when the torch 20 is operated in an inverted position, and if only a single opening 42 is employed in the diaphragm, the area of this single opening should be greater than the passage 33.

In assembly of the valve unit 22, the diaphragm 40 is placed on surface 32a of stem 32 with the annular detent 41 resting on the surface 32a. The stem 32 is threaded into valve body unit 22 until the outer annular periphery 40a is secured between surface 32a and shoulder 34. With needle valve 38 closed, the gas fuel will be maintained in bore 33 and the space 50 formed by the engagement of detents 41 with surface 32a. As the diaphragm 40 is formed or pre-stressed to be urged toward surface 32a, the diaphragm will be maintained in a closed condition when needle valve 38 is closed.

In some cases, it may be desirable to provide an indentable surface washer 60 in an annular recess 61 of surface 32a as shown in the modification of FIGURE 7. The detents 41 of diaphragm 40 will contact washer 60 for seating of the diaphragm 40. However, in the preferred embodiment of FIGURE 5, it has been found sufficient to seat the detents 41 directly on surface 32a to prevent the gas fuel from flowing through openings 42.

When needle valve 38 is opened by knob 26, the pressure of the gas or vapor in the cylinder is effective on the surface area of the diaphragm 40 interior of the detents 41 to deform the diaphragm and raise the detents from the surface 32a to allow flow of gaseous vapor through bore 33 and openings 42 to recess 35 from which the gaseous fuel passes upwardly through passages 36 and 39 to the nozzle unit 25 at a rate determined by the cylinder pressure and the needle valve opening.

When the pressure is balanced on both sides of diaphragm 40 as when the needle valve 38 is closed, the pre-stressed diaphragm 40 will be urged toward the surface 32a to seat annular detent 41. In addition, any pressure existing in recess 35 will act to assist the seating of detents 41. When, however, the valve 38 is opened, any pressure in recess is relieved, and the pressure in the cylinder 21 acts on the surface area of the diaphragm 40 to unseat the diaphragm to allow flow of gaseous vapor through openings 42 to recess 35 and passage 36 to the nozzle unit 25.

When the torch is inverted and the liquid fuel in the container 21 covers the end of valve 31, slugs of liquid and gas or liquid alone are permitted to enter the bore 33 and then to the chamber 35 wherein it vaporizes and is metered to the burner 25. As the fuel thus vaporizes in the chamber 35, it expands, and this expansion together with the stress of the diaphragm against the seat prevents free flow of additional gas or liquid to the chamber 35 until the pressures in the chamber 35 and container 21 have equalized.

While the preferred embodiment of the invention and a modification thereof have been described in detail, it will be understood by those skilled in the art that various changes and modifications may be made without departing from the spirit and scope of the invention, and it is intended therefore that the appended claims cover all such changes and modifications.

Various modes of carrying out the invention are contemplated as being within the scope of the following claims particularly pointing out and distinctly claiming the subject matter which is regarded as the invention.

We claim:

1. A portable gas fuel device comprising, a container for pressurized fuel provided with a discharge opening, a valve member secured within and normally closing said opening, a valve body receivable by said member and having a portion cooperable with said valve member to open the same, said valve body having a fuel passage therethrough and provided with a chamber intermediate the ends of said fuel passage, a resilient diaphragm peripherally secured within said chamber to span said passage, said diaphragm having an imperforate medial portion normally seated to close said passage and thereby prevent fuel from flowing therethrough and being provided with fuel flow apertures laterally offset from said imperforate medial portion, and valve means adapted to be manipulated to open and close said fuel passage independently of said diaphragm, said diaphragm being unseated by the pressure of the fuel within the container upon opening of said valve means to thereby permit flow of fuel through said passage on both sides of said chamber via the laterally offset apertures of said diaphragm.

2. A portable gas fuel device according to claim 1 wherein the diaphragm is formed with an annular detent segregating the imperforate medial portion from the laterally offset apertures and providing a seat surrounding the fuel passage on one side of the chamber.

3. A portable gas fuel device according to claim 1 wherein the combined area of the laterally offset fuel flow apertures of the diaphragm is larger than the cross-sectional area of the fuel passage.

4. A metering valve for attachment to a pressurized fluid fuel cylinder for controlling fluid flow from said cylinder to a fluid burning nozzle comprising, in combination, a valve body provided with fluid passage means communicable with said fluid burning nozzle and adapted to be secured to said pressurized fluid fuel cylinder, said valve body also being provided with adjustable valve means extending into said fluid passage means for controlling fluid fuel flow to said fluid burning nozzle, valve seat forming means engageable with said body to form an expansion recess at said fluid passage means, said valve seat forming means being provided with a bore therethrough for communicating fluid from said cylinder to said expansion recess, a normally flat pre-stressed metallic diaphragm interposed between said valve seat and said valve body and having an imperforate medial portion surrounded by an integral annular detent engageable with said valve seat for sealing said bore from said fluid passage means, said diaphragm also being provided with openings therein outwardly beyond said detent to allow fluid to pass therethrough to said fluid passage means when said diaphragm annular detent is unseated by pressurized fluid fuel from said cylinder.

References Cited by the Examiner

UNITED STATES PATENTS

| | | | |
|---|---|---|---|
| 2,435,040 | 1/48 | Heidbrink et al. | 222—3 |
| 2,793,504 | 5/57 | Webster | 222—3 |

FOREIGN PATENTS 1,090,425 3/55 France.

EVERETT W. KIRBY, *Primary Examiner.*

HADD S. LANE, *Examiner.*